May 31, 1949.  E. L. CHAFFEE  2,471,517
MACHINE FOR SEPARATING SPENT HOPS FROM WORT
Filed April 15, 1946  3 Sheets-Sheet 1
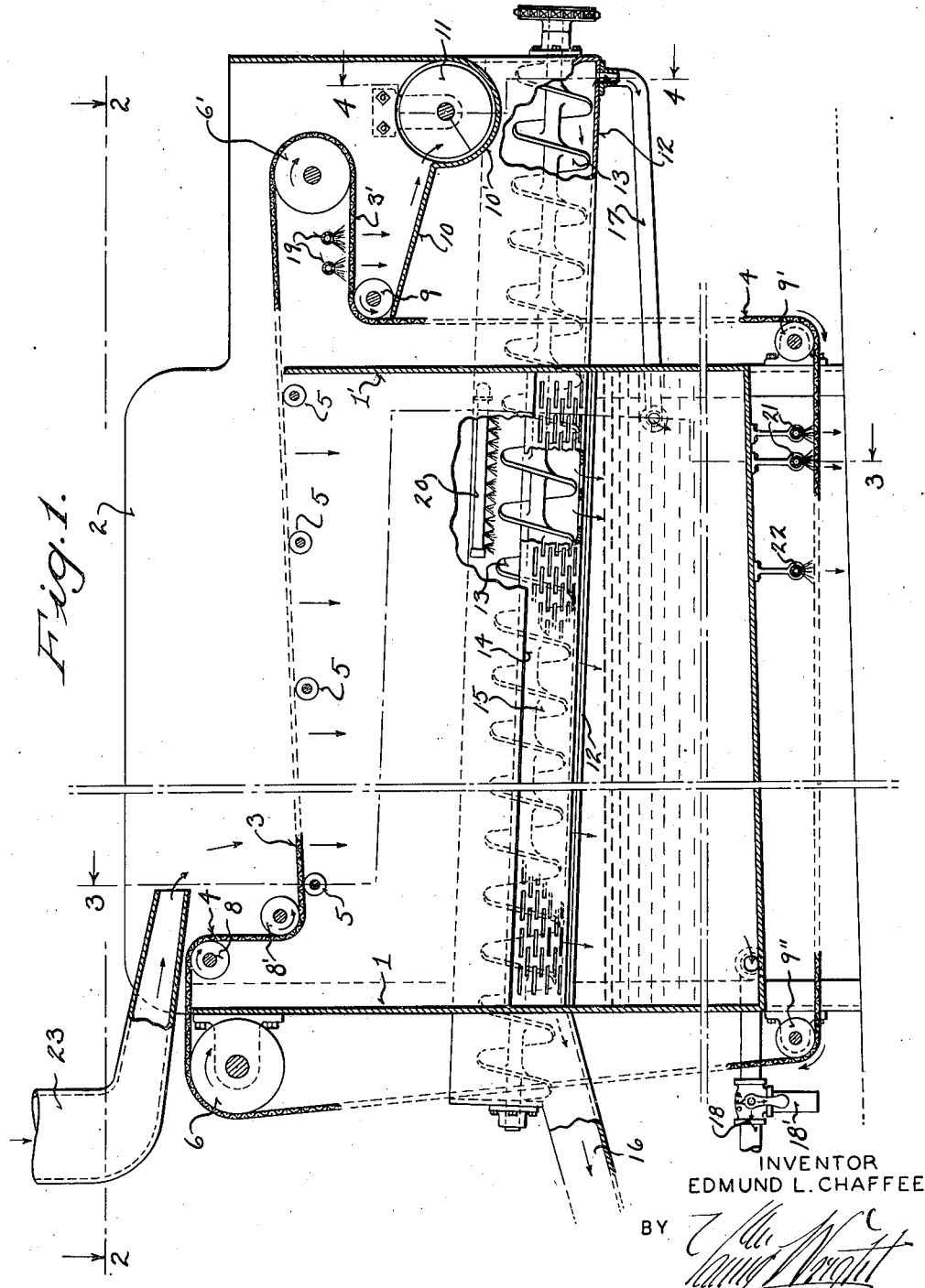
INVENTOR
EDMUND L. CHAFFEE
BY
ATTORNEYS May 31, 1949. E. L. CHAFFEE 2,471,517
MACHINE FOR SEPARATING SPENT HOPS FROM WORT
Filed April 15, 1946 3 Sheets-Sheet 2
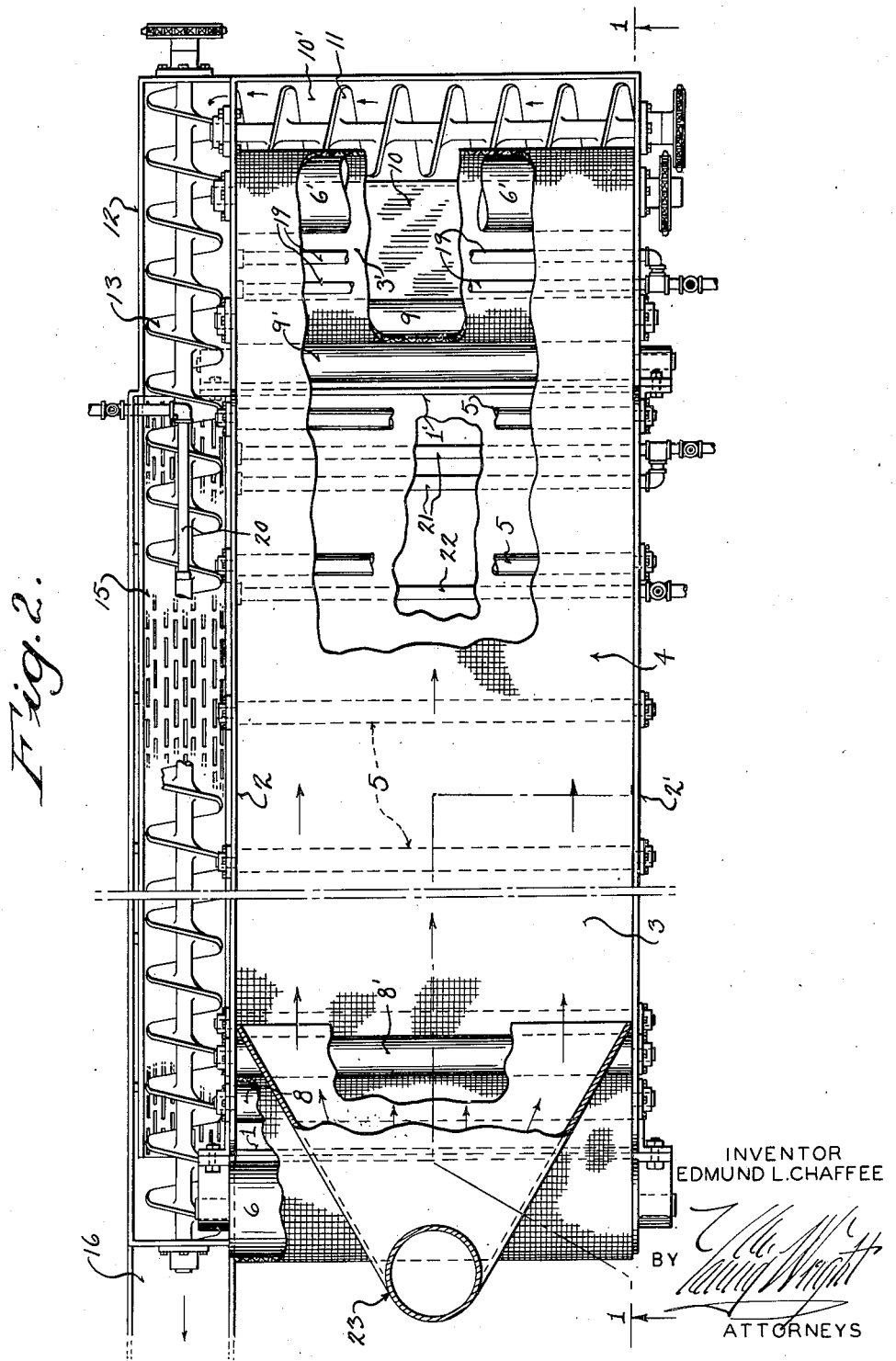
INVENTOR
EDMUND L. CHAFFEE
BY
ATTORNEYS

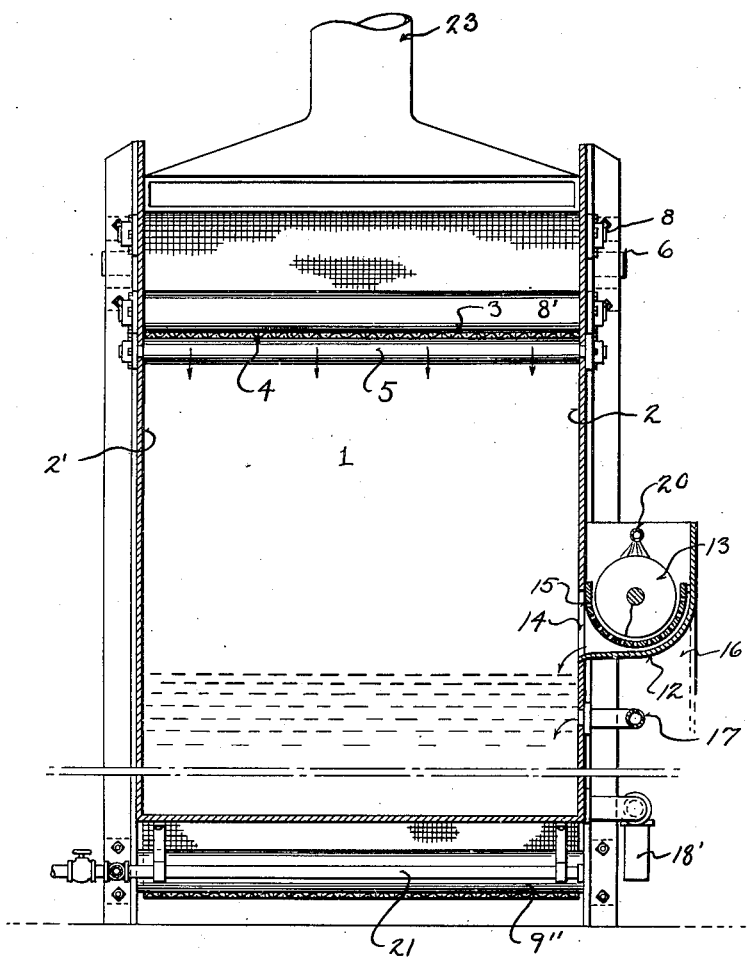
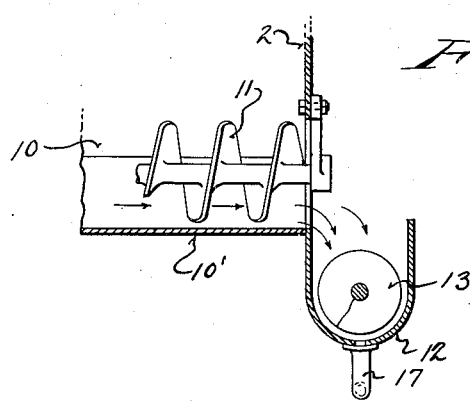
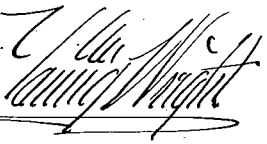

Patented May 31, 1949

2,471,517

UNITED STATES PATENT OFFICE 2,471,517

MACHINE FOR SEPARATING SPENT HOPS FROM WORT

Edmund L. Chaffee, Milwaukee, Wis.

Application April 15, 1946, Serial No. 662,167

1 Claim. (Cl. 210—149)

My invention refers to a method and apparatus for the manufacture of beer and it has for its primary object to provide a simple and effective machine for continuously separating spent hops from wort and thoroughly collecting all sugar deposits which adhere to the moist spent hops.

The specific object of my invention is to provide an endless screen cloth belt having a working stretch, travelling through a tank, for separating the wort from the spent hops. The hops delivered to a transversely disposed hopper carrying a driven spiral conveyor, are adapted to discharge in a longitudinally disposed trough. This trough communicates with the tank and the same has a driven spiral conveyor therein, whereby in the transverse and longitudinal travel of the waste hops, all liquified sugary products are extracted therefrom and delivered to the wort tank.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a sectional side elevation of a machine embodying the features of my invention, the section being indicated by the line 1—1 of Figure 2.

Figure 2, a top plan view of the same partly in section as indicated by line 2—2 of Figure 1, parts being broken away and in section to more clearly illustrate structural features.

Figure 3 is a cross section of the machine, the section being indicated by line 3—3 of Figure 1, and Figure 4 is a fragmentary sectional elevation, illustrating associated ends of the two spiral conveyors, the section being indicated by line 4—4 of Figure 1.

Referring by characters to the drawings, I indicates the front wall of an open tank and I' the rear wall thereof connected by side walls 2, 2'.

Mounted in the mouth of the tank is the working stretch 3 of an endless screen cloth belt 4.

The working stretch 3 is supported by a series of rollers 5, which rollers are slightly inclined with relation to each other from the front to the rear of said tank, whereby the working stretch of the belt is upon a slight incline and is trained over an idle roller 6 and a driven roller 6'.

In order to encase the working belt stretch, at the receiving end of the tank, I provide a pair of stepped guide rollers 8, 8', which rollers are suitably journaled in the side walls of the tank, whereby the working belt stretch is dropped well below the mouth of the tank, to prevent splashing. The idle horizontal short stretch 3' of the belt is returned from the driven roller 6' and trained over a guide roller 9 from which roller the stretch extends downwardly over a roller 9' under the tank and from said roller the idle belt stretch travels over a corresponding roller 9'' and from thence upwardly to the idle roller 6.

The rear or discharge end of the tank is formed with a hopper 10 having a slightly inclined semi-circular bottom 10' for the reception of a transversely disposed, suitably helical conveyor 11. It should be noted that the wort and hops drop by gravity from the endless screen belt 5 upon the inclined floor of the hopper 10. In so doing the mixture striking the floor will be subjected to a pounding and scattering action, whereby the mash is more or less separated from the fluid. The same result is obtained in the drop of a mash from the hopper bottom 10' to the trough 12, and in this repeated provision the effectiveness of the machine is materially increased, keeping in mind the successful squeezing of the material as it travels or is pushed through the various worms.

As best illustrated in Figure 4 of the drawings, the bottom 10' of the hopper 10, at one end, communicates with an upwardly inclined circular bottom trough 12, which trough is attached to the side of the tank 2. This longitudinally disposed trough is inclined upwardly from the hopper toward the receiving end of the tank, as best indicated in Figure 1.

Mounted in the trough is a driven spiral worm 13 which extends from end to end of the tank and hopper.

As best illustrated in Figure 3 of the drawing, the trough is provided with a drainage opening 14 communicating with the wort tank.

The trough 12 has removably fitted therein a semi-circular perforated shell 15 which shell is concentric with the spiral worm 13.

The functions of this shell are to trap any spent hops from entering the tank, and for cleaning purposes, it may readily be removed. Thus, it should be noted that while the product is traveling in the group opposite the tank slot 14, the conveyor exerts a continuous pressure upon the product, whereby the squeezing effect will cause the fluid to strain through the slot 14 from end to end and thereby not bank up at any point of discharge.

As indicated in Figure 1 of the drawings, the upper end of the trough is provided with a hop discharge chute 16, directed to any suitable waste receiver.

The bottom of the trough, at its lower end, communicates with the tank through an inclined drain pipe 17.

The front bottom corner of the tank is provided with a valve controlled drain pipe 18 whereby the wort may be drawn off to the cooler and which also serves, through a branch 18', as a drainage for the tank, when the same is to be cleaned.

In order to remove any sugary desposits which may adhere to the screen, I provide a pair of low pressure liquid spray pipes 19 which are positioned directly over the horizontal stretch 3' of the belt and due to their discharge, all accumulated desirable matter adhering to the interstices of the belt are thoroughly washed out. This fluid is drained directly into the bottom of the hopper, for the purpose of recovering the same. The trapped fluid, comingling with the waste hops, tends to dissolve all sugar deposits which may have adhered to the hops.

It is to be understood that as the hops are slowly moved upwardly in the trough 12, they are also subjected to a spray from a pipe 20, which, as shown, extends through the lower end of the trough upwardly, a predetermined distance, to continuously subject the hops to a sparging spray. The sparge water is trapped, after passing through the hops, and is drained off into the tank.

As noted in Figure 1 of the drawings, the idle stretch of the belt, below the tank, has extending transversely thereof a pair of high pressure cleaning pipe sprays 21, for the purpose of forcibly removing any traces of hops, which may remain lodged in the screen.

Directly in advance of the cleaning sprays, I also provide a high temperature steam spray pipe 22, which spray pipe is to be utilized, at predetermined intervals, for cleaning up the belt, whereby incrustations from the hop residuents are removed and the belt is sterilized by removing remnants of caustic or the like which may be used for scouring purposes.

As illustrated in Figures 1 and 2 of the drawings, the hot wort and hops are delivered to the tank through a pipe 23 having a flared fan-like discharge mouth 23', which mouth is of approximately the same width as the belt, whereby the product is discharged upon said working face of the belt in an even, thin layer.

It should be also understood that in practice, the apparatus is suitably encased in a hood, whereby the hot vapors are trapped as they pass through the machine.

In some instances I may, without departing from the spirit of my invention, utilize a gyrating screen, as a substitute for the endless screen belt.

From the foregoing description, it is apparent the mixture of the wort fluid and hops is discharged in a thin layer upon the upper stretch of the wire belt. The fluid will be drained through said belt into the tank and the moist hops will be discharged by gravity into the hopper.

The jet spray pipe 19, at the same time, will thoroughly clean out the interstices of the belt and this fluid will also settle into the bottom of the hopper with the spent hops.

The hops then are slowly moved to the discharge end of the hopper being more or less agitated and compressed, in their movement, by the spiral conveyor 11.

The collected sugary liquid is drained into the trough 12, simultaneously with the delivery of the spent hops therein. The hops are thereafter slowly fed through the slightly inclined side trough 15 and drainage of the liquid is discharged into the tank through the drainage opening 14.

As the spent hops travel from end to end of the longitudinal trough, they are agitated and slightly compressed, due to the action of the worm and at the same time the hops are again subjected to a sparging spray, through the low pressure fluid pipe 20. Hence, all sugar deposits are thoroughly separated from the hops and this sugary liquid is discharged into the wort contained in the tank, while the waste product is delivered to a suitable receptacle, through the spout 16, located at the upper end of the trough.

I claim:

A machine for separating spent hops from wort, comprising a storage tank having side walls and front and rear walls, one side wall being provided with a longitudinally disposed drain slot extending from the front to the rear walls thereof and inclined downwardly towards said rear wall, a wort receiving hopper extending from the rear wall of said tank, having a semi-circular bottom inclined towards the slotted side of the tank and provided with a discharge mouth, an inclined trough extending from the slotted side wall of said tank and hopper communicating with the hopper discharge mouth and tank drain slot, whereby a fluid receiving pocket is formed at the lower end of said trough, a pipe communicating with the lower pocket end of the trough and tank, a semi-circular screen seated in the bottom of the aforesaid trough and extending longitudinally of the tank drain slot communicating with the same, and driven worms nested within the trough and hopper bottom, whereby the saturated hops are discharged into the bottom pocket of the trough and thereafter caused to travel upwardly therein to drain the wort through the slot into the tank.

EDMUND L. CHAFFEE.

REFERENCES CITED

The following references are of record in the file of this patent:

UNITED STATES PATENTS

| Number | Name | Date |
|---|---|---|
| 392,606 | Heywood | Nov. 13, 1888 |
| 984,434 | Laubenheimer | Feb. 14, 1911 |
| 1,056,738 | Catlett et al. | Mar. 18, 1913 |
| 1,235,672 | Fitch et al. | Aug. 7, 1917 |
| 1,624,385 | Bergen | Apr. 12, 1927 |
| 2,100,942 | Cutter | Nov. 30, 1937 |
| 2,146,692 | Tiedman | Feb. 7, 1939 |
| 2,249,792 | Skinner | July 22, 1941 |
| 2,312,764 | Lubke | Mar. 2, 1943 |
| 2,341,274 | Hoff | Feb. 8, 1944 |
| 2,370,138 | Bonotto | Feb. 27, 1945 |
| 2,420,927 | Anderson | May 20, 1947 |